United States Patent
Tanaka

(10) Patent No.: US 11,595,975 B2
(45) Date of Patent: Feb. 28, 2023

(54) COMMUNICATION SYSTEM, NODE, COMMUNICATION METHOD, AND COMPUTER PROGRAM PRODUCT

(71) Applicant: KABUSHIKI KAISHA TOSHIBA, Tokyo (JP)

(72) Inventor: Yasuyuki Tanaka, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 78 days.

(21) Appl. No.: 17/179,302

(22) Filed: Feb. 18, 2021

(65) Prior Publication Data
US 2022/0022212 A1    Jan. 20, 2022

(30) Foreign Application Priority Data
Jul. 20, 2020 (JP) .............................. JP2020-123956

(51) Int. Cl.
H04W 72/12 (2009.01)
H04W 72/04 (2009.01)
H04W 72/0453 (2023.01)
H04W 72/0446 (2023.01)

(52) U.S. Cl.
CPC ... *H04W 72/1257* (2013.01); *H04W 72/0446* (2013.01); *H04W 72/0453* (2013.01)

(58) Field of Classification Search
CPC ......... H04W 72/1257; H04W 72/0446; H04W 72/0453
USPC ....................................................... 370/329
See application file for complete search history.

(56) References Cited

U.S. PATENT DOCUMENTS

2020/0314841 A1* 10/2020 Thubert ................ H04W 40/02
2020/0413354 A1* 12/2020 Thubert ............... H04W 56/001
2021/0022098 A1*  1/2021 Thubert ............... H04W 56/004
2021/0105668 A1*  4/2021 Thubert .................. H04L 45/42

FOREIGN PATENT DOCUMENTS

WO    WO-2021053263 A1 *  3/2021 .......... H04W 72/121

OTHER PUBLICATIONS

Vilajosana, X. et al., "Minimal IPv6 over the TSCH Mode of IEEE 802. 15. 4e (6TiSCH) Configuration," IETF RFC 8180, 28 pages (2017).
Duquennoy, Simon et al., "Orchestra: robust Mesh Networks through Autonomous Scheduled TSCH,", Proc. of the 13th ACM Conf. on Embedded Networked Sensor Systems, pp. 337-350 (2015).
Winter, T. et al., "RPL: Ipv6 Routing Protocol for Low-Power and Lossy Networks," IETF RFC 6550, 157 pages (2012).

* cited by examiner

*Primary Examiner* — Faisal Choudhury
(74) *Attorney, Agent, or Firm* — Finnegan, Henderson, Farabow, Garrett & Dunner, LLP

(57) ABSTRACT

According to an embodiment, a communication system includes a plurality of nodes that forms a wireless multi-hop network. Transmission timings of network advertising packets transmitted from the plurality of nodes are controlled based on a transmission schedule in which each of the plurality of nodes has one transmission cell at a location different from other nodes. One of the nodes includes a processor and a wireless communication controller. The processor determines a transmission timing of the corresponding network advertising packet based on the transmission schedule. The wireless communication controller transmits the network advertising packet at the transmission timing.

9 Claims, 4 Drawing Sheets

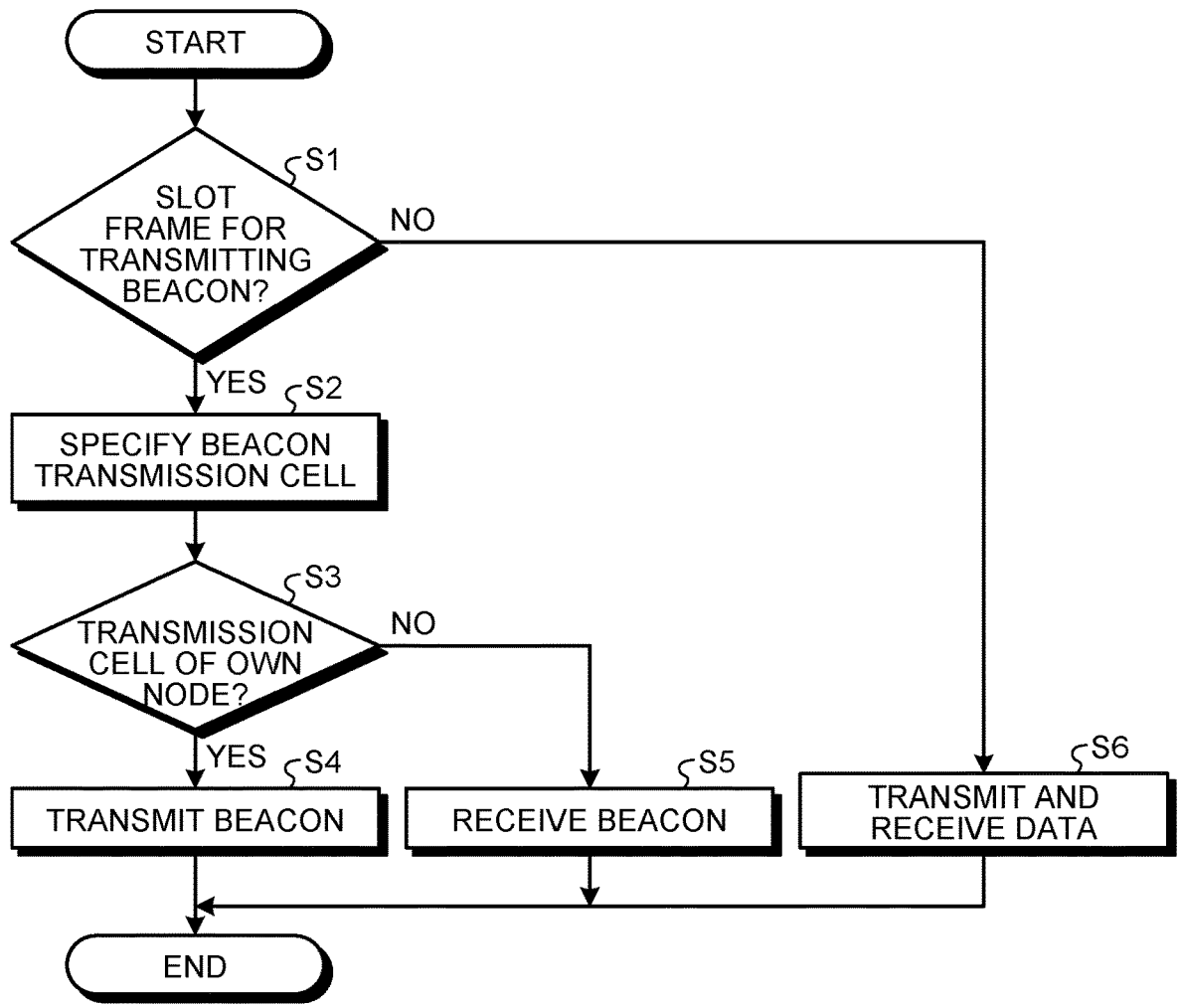

COMMUNICATION SYSTEM, NODE, COMMUNICATION METHOD, AND COMPUTER PROGRAM PRODUCT

CROSS-REFERENCE TO RELATED APPLICATIONS

This application is based upon and claims the benefit of priority from Japanese Patent Application No. 2020-123956, filed on Jul. 20, 2020; the entire contents of which are incorporated herein by reference.

FIELD

Embodiments described herein relate generally to a communication system, a node, a communication method, and a computer program product.

BACKGROUND

Time synchronized channel hopping (TSCH) has been conventionally used as a communication method for a plurality of nodes that forms a wireless multi-hop network. In the wireless multi-hop network, searching for neighboring nodes existing near the own node is performed.

However, in the conventional technology, there have been problems that it takes time to discover a neighboring node or that a specific neighboring node cannot be found.

BRIEF DESCRIPTION OF THE DRAWINGS

FIG. 4 is a flowchart illustrating an example of a communication method according to the first embodiment;

FIG. 5 is a diagram illustrating an example of a beacon transmission schedule according to a second embodiment.

DETAILED DESCRIPTION

According to an embodiment, a communication system includes a plurality of nodes that forms a wireless multi-hop network. Transmission timings of network advertising packets transmitted from the plurality of nodes are controlled based on a transmission schedule in which each of the plurality of nodes has one transmission cell at a location different from other nodes. One of the nodes includes a processor and a wireless communication controller. The processor is configured to determine a transmission timing of the corresponding network advertising packet based on the transmission schedule. The wireless communication controller is configured to transmit the network advertising packet at the transmission timing.

Embodiments of a communication system, a node, a communication method, and a computer program product will be described in detail with reference to the accompanying drawings.

Conventional TSCH communication technologies include, for example, IETF RFC 6550, Orchestra, and the like.

IETF RFC 6550 uses a message called DODAG information solicitation (DIS) to quickly discover neighboring nodes. Neighboring nodes that receive DIS shorten the transmission interval of frames for network advertisement (packets) called DODAG information object (DIO), but in TSCH, DIO is transmitted on the broadcast cell.

On the other hand, Orchestra has a slot frame dedicated to beacon transmission called EB slotframe. In this slot frame, each node transmits a beacon at a timing based on the MAC address. As a result, a plurality of nodes does not transmit beacons (frames for network advertisement) at the same time, but the beacons transmitted by the nodes cannot be received unless the MAC addresses of neighboring nodes are known in advance. In other words, the EB slotframe is not suitable for the purpose of discovering unknown neighboring nodes.

With conventional TSCH communication technology, the only way to discover neighboring nodes after synchronizing with the TSCH network is to receive network advertising frames such as beacons from neighboring nodes in the transmission cell (TSCH link) assigned for broadcasting. However, since the allocation of broadcast cells is usually limited and a plurality of nodes can transmit frames at the same time, the possibility of network advertising frame collision is higher than that of other communications. Therefore, there has been problems that it takes time to discover a neighboring node, or that a specific neighboring node cannot be found.

A following first embodiment describes a communication system, a node, a communication method, and a program that can discover a neighboring node more quickly.

First Embodiment

First, an example of a device configuration of a communication system according to the first embodiment will be described.

Example of Device Configuration

Figure 1:
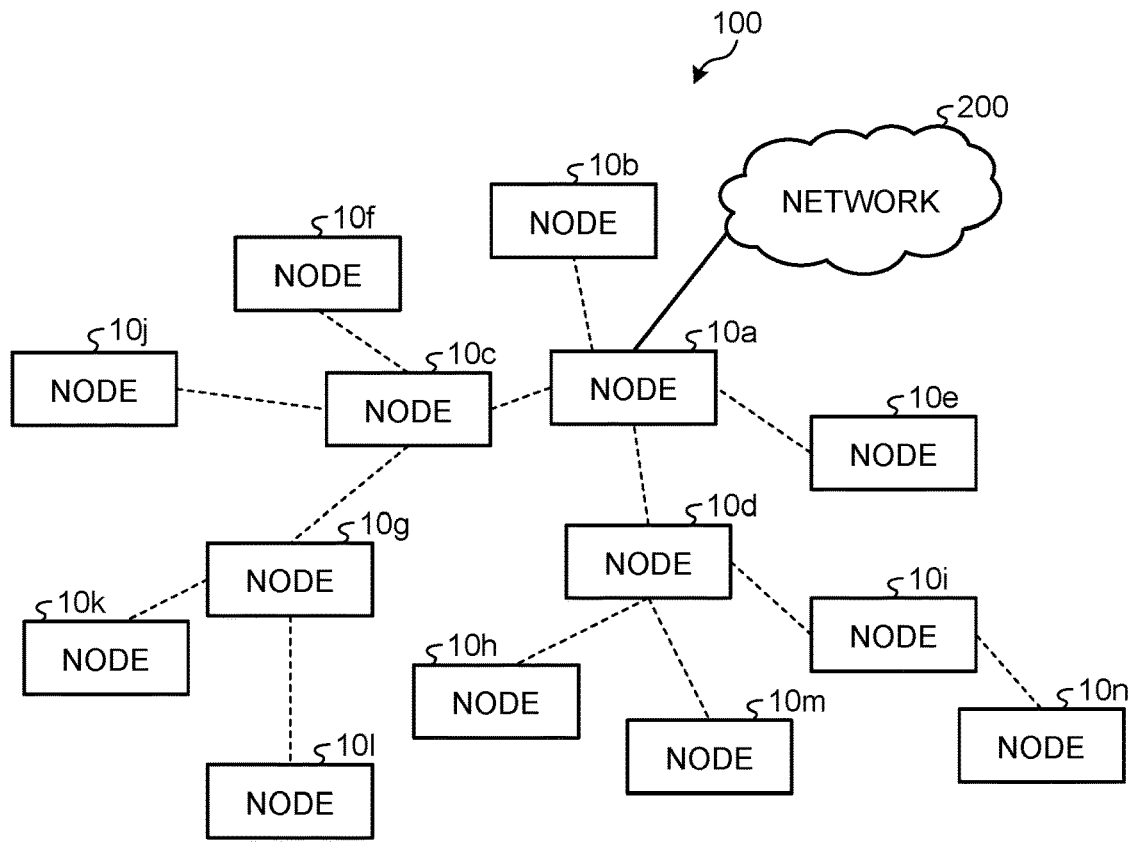
FIG. 1 is a diagram illustrating an example of a device configuration of a communication system according to a first embodiment.

FIG. 1 is a diagram illustrating an example of a device configuration of a communication system 100 according to the first embodiment. The communication system 100 of the first embodiment includes nodes 10a to 10n and a network 200.

The nodes 10a to 10n are communication devices forming a wireless multi-hop network. The dotted lines in FIG. 1 represent wireless links. The connection relationship represented by the dotted lines indicates a routing tree formed by the nodes 10a to 10n. Hereinafter, when the nodes 10a to 10n are not distinguished, they are simply referred to as a node 10.

The node 10a has a connection with the network 200 in addition to the wireless links with the nodes near the node 10a. Typically, the network 200 is the Internet. The node 10a operates as a router (a gateway, an aggregator, or a concentrator) that connects the wireless multi-hop network formed by the nodes 10a to 10n and the external network 200. It is noted that the node 10a does not always have to have a connection with the network 200.

Regarding the communication system 100 of the first embodiment, a case where TSCH of IEEE 802.15.4 is used as a wireless communication standard will be described as an example. The wireless communication standard is not limited to IEEE 802.15.4, and may be any wireless communication standard that communicates using the time division multiplexing method. For example, the wireless communication standard may be IEEE 802.11, Wi-SUN FAN, or the like, or may be an original communication standard. Further, channel hopping (frequency hopping) does not necessarily have to be performed.

Next, an example of a functional configuration of the node 10 of the first embodiment will be described.

Example of Functional Configuration of Node

Figure 2:
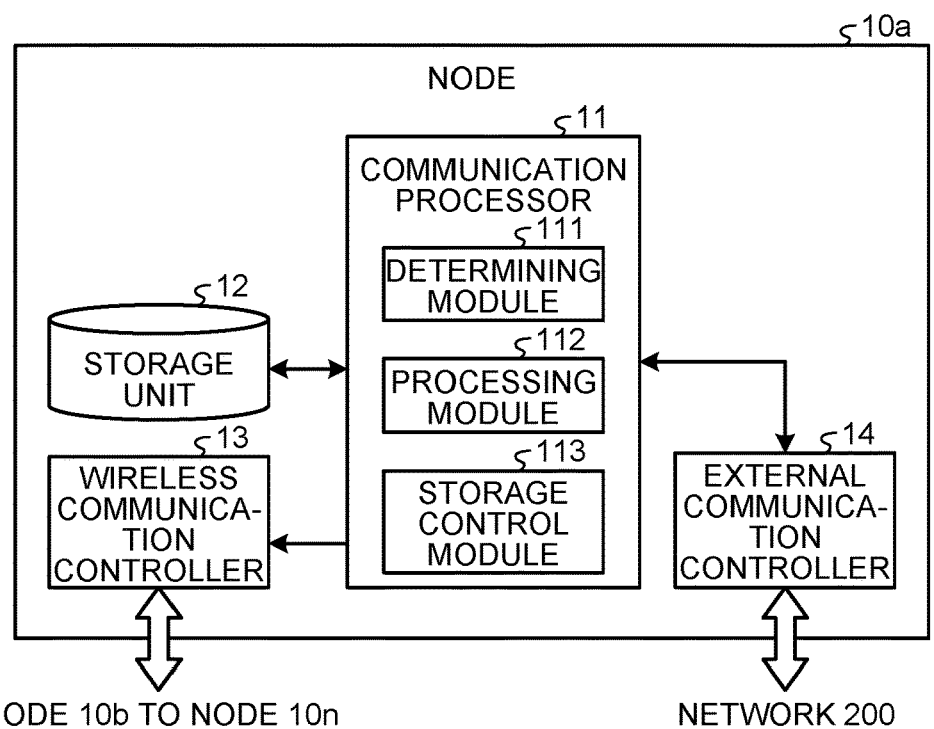
FIG. 2 is a diagram illustrating an example of a functional configuration of a node according to the first embodiment.

FIG. 2 is a diagram illustrating an example of the functional configuration of the node 10 according to the first embodiment. The node 10 of the first embodiment includes a communication processor 11, a storage unit 12, a wireless communication controller 13, and an external communication controller 14.

The communication processor 11 includes a determining module 111, a processing module 112, and a storage control module 113.

The determining module 111 determines a transmission timing of a network advertising packet and a channel used for transmitting the network advertising packet based on a transmission schedule (see FIG. 3) in which each of the plurality of nodes has one transmission cell at a different location.

The processing module 112 performs network communication processing. For example, the processing module 112 performs packet transfer process on a wireless multi-hop network formed by nodes 10a to 10n. Further, for example, the processing module 112 generates, transmits, and receives application data.

The storage control module 113 performs a storage control (reading, writing, etc.) of information stored in the storage unit 12.

The storage unit 12 stores the above-mentioned transmission schedule and the like.

The wireless communication controller 13 connects to the wireless multi-hop network, starts operating as a part of the wireless multi-hop network, and then starts transmitting a network advertising packet of IEEE 802.15.4. For example, a network advertising packet is at least one of a beacon, an extended beacon, and a routing protocol control packet. The beacon includes an identifier that identifies the wireless multi-hop network, information indicating a data communication schedule of the wireless multi-hop network, and the like. In addition, the upper layer may transmit a network advertising packet. For example, DODAG information object (DIO) of IETF RFC 6550 is also considered as a network advertising packet.

The external communication controller 14 controls communication via the network 200. Note that the nodes 10b to 10n do not have to be provided with the external communication controller 14. Further, the node 10a does not have to be provided with the external communication controller 14 in a case where the communication via the network 200 is not performed.

Example of Transmission Schedule

Figure 3:
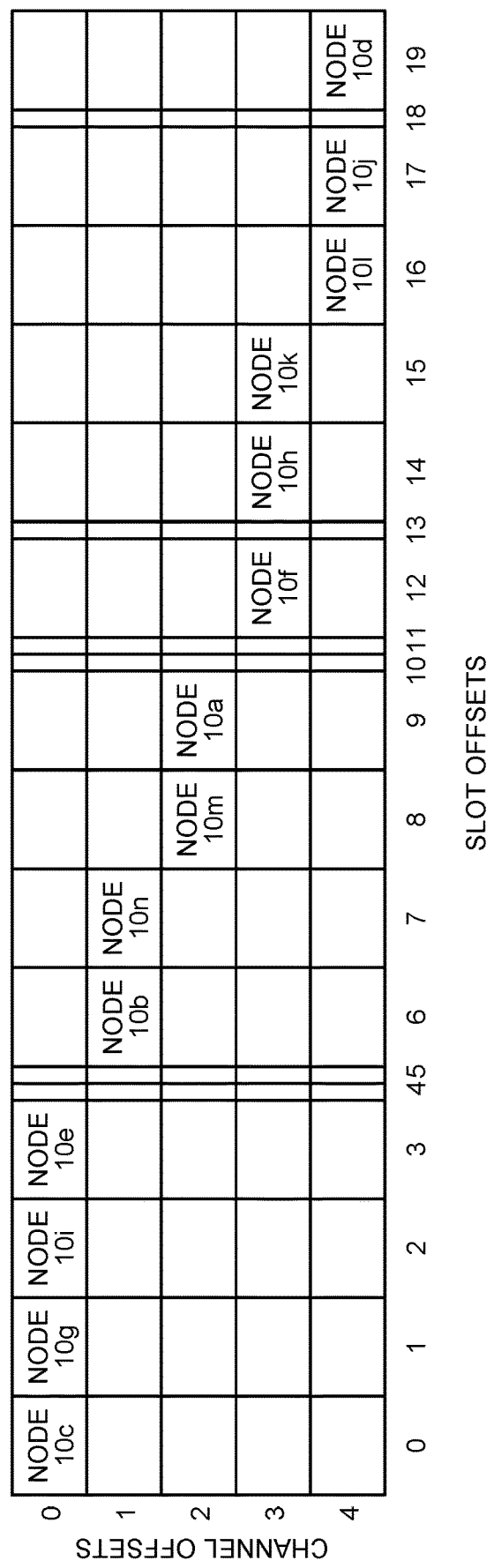
FIG. 3 is a diagram illustrating an example of a beacon transmission schedule according to the first embodiment.

FIG. 3 is a diagram illustrating an example of the beacon transmission schedule according to the first embodiment. The transmission schedule of the beacon of the first embodiment is controlled by repeating a slot frame including 20 slot offsets divided in the time direction and five channel offsets (channels) divided in the frequency direction. Each of the plurality of nodes 10 has one transmission cell (transmission opportunity) at a different location in the transmission schedule. The transmission cell is identified by a slot offset and a channel offset.

In the example of FIG. 3, the slot offsets are specified by slot offset numbers 0 to 19 that identify the slot offsets. Similarly, the channel offsets are specified by channel offset numbers 0 to 4 that identify the channel offsets. Hereinafter, a slot offset having a slot offset number i is referred to as a slot offset i, and a channel offset having a channel offset number j is referred to as a channel offset j.

In the transmission schedule of FIG. 3, the beacon transmission cell is determined by the following equation (1).

$$\text{channel\_offset} = \text{int}(\text{slot\_offset}/\alpha) \% \text{number\_of\_channels} \quad (1)$$

Here, "slot offset" indicates the current slot offset. "$\alpha$" is a number used to determine the channel offset at which the beacon is transmitted. "int" is an operator that truncates after the decimal point and takes the integer part. In the example of FIG. 3, $\alpha$=4. "number_of_channels" indicates the number of channels. In the example of FIG. 3, number_of_channels=5. "output channel_offset" indicates the channel offset at which the beacon transmission cell is set at the current slot offset.

According to the above equation (1), the channel offset of the transmission cell of the network advertising packet is specified by the remainder of the number of channels 5 which is the value obtained by dividing the slot offset number for identifying the slot offset by a predetermined number $\alpha$.

For example, at slot offset=0, channel_offset=int(0/4)%5=0. When slot_offset=1, channel_offset=int(1/4)%5=0. At slot_offset=2, channel_offset=int(2/4)%5=0. At slot_offset=3, channel_offset=int(3/4)%5=0. At slot_offset=4, channel_offset=int(4/4)%5=1.

According to the above equation (1), in the transmission schedule example of FIG. 3, the beacon transmission cell is set to the channel offset 0 at the slot offsets 0 to 3 (the time when the current time corresponds to the slot offsets 0 to 3). At the slot offsets 4 to 7, the beacon transmission cell is set at the channel offset 1. At the slot offsets 8 to 11, the beacon transmission cell is set at the channel offset 2. At the slot offsets 12 to 15, the beacon transmission cell is set at the channel offset 3. At the slot offsets 16 to 19, the beacon transmission cell is set at the channel offset 4.

In the transmission schedule of FIG. 3, the maximum slot offset value (slot frame length) is equal to the product of a and the number of channels (4×5=20).

As illustrated in FIG. 3, the nodes 10a to 10n have one transmission cell at different locations within the beacon transmission schedule. The determining module 111 determines the transmission timing of the network advertising packet based on the slot offset of the transmission cell (own node transmission cell) assigned to the own node, and determines the channel used for transmitting the network advertising packet based on the channel offset of the own node transmission cell.

The transmission cells (slot offset and channel offset) assigned to each node 10 may be determined centrally by an instruction of a predetermined device such as the node 10a and an external node (for example, path computation element (PCE)), for example, when each node 10 is connected to the wireless multi-hop network. Further, for example, the transmission cell assigned to each node 10 may be determined based on the identification information such as the MAC address of the node 10.

In the first embodiment, each node 10 may have a short address (16-bit MAC address). The short address may be encoded with the channel offset and slot offset used for the beacon transmission cell. For example, the upper 8 bits represent the channel offset and the lower 8 bits represent the slot offset. The coding method of the channel offset and the slot offset is not limited to this expression example and may be arbitrary as long as the transmission cell can be uniquely specified from the short address. For example, the slot offset may be represented in the upper 8 bits and the channel offset may be represented in the lower 8 bits.

The short address allocation setting may be statically performed for each node 10, or the short address may be dynamically assigned to each node 10 by the node 10a in FIG. 1 and an external node (for example, PCE).

The wireless communication controller 13 of each node 10 waits for reception of a beacon transmitted from another node other than the transmission cell assigned to the own node among the transmission cells determined by the above equation (1). For example, as illustrated in FIG. 3, the node 10c waits for reception of a beacon from another node other than the slot offset 0 and the channel offset 0 among the transmission cells assigned to each node 10.

In the case of TSCH, the transmission schedule of FIG. 2 may be expressed as one of a plurality of slot frames. Each slot frame is identified by a slot frame number that identifies the slot frame. Hereinafter, a slot frame having a slot frame number k may be referred to as a slot frame k.

For example, when the slot frame number takes a specific value, the wireless communication controller 13 of each node 10 uses the slot frame of the slot frame number as a transmission schedule of network advertising packets (for example, beacon, DIO, and the like). The method of determining this specific value may be arbitrary.

For example, each node 10 transmits a beacon in a slot frame having a slot frame number satisfying (current slot frame number %$\beta$)<(number of channels). Here, "$\beta$" is a number used to determine the slot frame for transmitting the beacon.

Specifically explaining the case where $\beta=20$ and the number of channels is 5 as illustrated in FIG. 3, if the slot frame number of the current slot frame is 41, (41%20)=1<5, so each node 10 transmits a beacon in the slot frame. If the slot frame number of the current slot frame is 46, then (46%20)=6>5, so each node 10 does not transmit a beacon in that slot frame. In the slot frame in which the beacon is transmitted, each node 10 waits for receiving of a beacon of another node at a slot offset in which a beacon is not transmitted.

Assuming that the length of the slot frame is L, the slot offset number of the current slot offset is calculated by ASN % L. Here, the absolute slot number (ASN) indicates the current time in the transmission schedule (TSCH schedule). Here, "%" is an operator for calculating the remainder.

Further, for example, the node 10 to which the beacon transmission cell (TSCH link) is assigned to the channel offset x and the slot offset y of the slot frame of length L transmits DIO as a network advertising frame when ASN % L==x and (ASN/L)%$\beta$==y.

If the receiving node 10 continues to wait for reception at that channel offset when (ASN/L)%$\beta$ is a valid channel offset, the node 10 can continuously receive frames for network advertisement (DIO) from neighboring nodes and can more efficiently discover neighboring nodes than before.

Example of Communication Method

FIG. 4 is a flowchart illustrating an example of the communication method according to the first embodiment. First, the determining module 111 determines whether or not the current slot frame is a slot frame for transmitting a beacon based on the slot frame number of the current slot frame (Step S1). When the current slot frame is not a slot frame for transmitting a beacon (Step S1, No), the processing module 112 of each node 10 transmits and receives data such as an application within the slot frame (Step S6). Although the description is omitted in FIG. 4, if there is no application to be transmitted or if the data reception waiting process is not scheduled, the node 10 does not perform any communication process.

When the current slot frame is a slot frame for transmitting a beacon (Step S1, Yes), the determining module 111 identifies the channel offset (identifies the transmission cell) at which the beacon is transmitted at the slot offset corresponding to the current time based on the beacon transmission schedule in FIG. 3 (Step S2).

When the transmission cell specified by the process of Step S2 is the transmission cell assigned to the own node (Step S3, Yes), the wireless communication controller 13 transmits a beacon in the transmission cell (Step S4). When the transmission cell specified by the process of Step S2 is not the transmission cell assigned to the own node (Step S3, No), the wireless communication controller 13 receives a beacon transmitted by other nodes in the transmission cell (Step S5).

As described above, in the communication system 100 of the first embodiment, the transmission timing of the network advertising packet transmitted from the plurality of nodes 10 is controlled based on the transmission schedule in which each of the plurality of nodes 10 has one transmission cell at a different location. Each node 10 determines the transmission timing of the network advertising packet based on the transmission schedule of FIG. 3. Then, the wireless communication controller 13 transmits the network advertising packet at the transmission timing.

As a result, according to the communication system 100 of the first embodiment, neighboring nodes can be discovered more quickly.

Second Embodiment

Next, a second embodiment will be described. In the description of the second embodiment, the same description as that of the first embodiment will be omitted, and the parts different from the first embodiment will be described. In the second embodiment, the transmission control of the network advertising packet when the number of slot offsets included in the slot frame is equal to the predetermined number $\alpha$ will be described.

Example of transmission schedule FIG. 5 is a diagram illustrating an example of a beacon transmission schedule of the second embodiment. The beacon transmission schedule of the second embodiment is controlled by repeating a slot frame including four slot offsets and five channel offsets (channels). Each of the plurality of nodes 10 has one transmission cell (transmission opportunity) at a different location in the transmission schedule. The transmission cell is identified by a slot offset and a channel offset.

The wireless communication controller 13 of each node 10 of the second embodiment transmits a network advertising packet when the slot offset number of the transmission cell assigned to the own node matches the remainder caused by the number of channels of the current slot frame number.

For example, in slot frame 0, from 0%5=0, the nodes 10c, 10g, 10i, and 10e having transmission cells at the channel offset 0 transmit network advertising packets. Also, for example, in slot frame 7, from 7%5=2, the nodes 10m and 10a having transmission cells at the channel offset 2 transmit the network advertising packets.

The wireless communication controller 13 of each node 10 of the second embodiment specifies the transmission cell of the network advertising packet transmitted by the other node based on the transmission schedule of FIG. 5 and the remainder caused by the number of channels of the current slot frame number and waits for reception of network advertising packets transmitted by the other node in the specified transmission cell.

As a result, according to the communication system 100 of the second embodiment, the neighboring node can be found more quickly as in the first embodiment.

Finally, an example of the hardware configuration of the node 10 of the first and second embodiments will be described.

Example of Hardware Configuration

Figure 6:
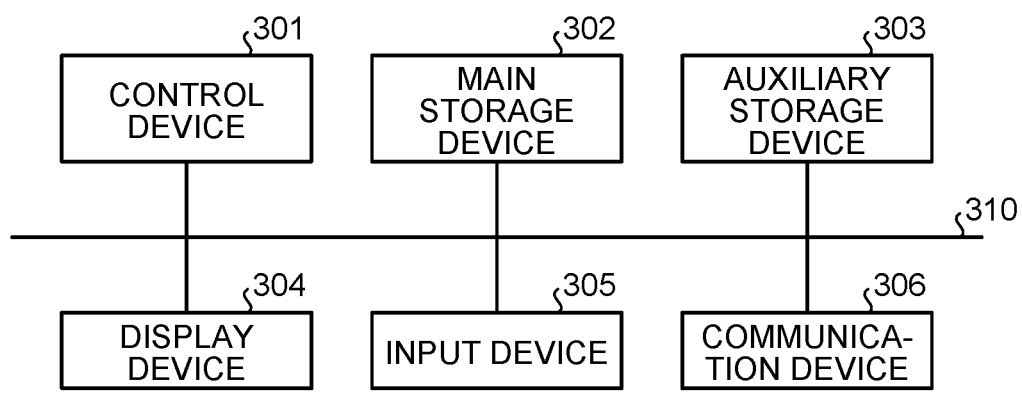
FIG. 6 is a diagram illustrating an example of a hardware configuration of the node according to the first and second embodiments.

FIG. 6 is a diagram illustrating an example of a hardware configuration of the node 10 of the first and second embodiments. The node 10 of the first and second embodiments includes a control device 301, a main storage device 302, an auxiliary storage device 303, a display device 304, an input device 305, and a communication device 306. The control device 301, the main storage device 302, the auxiliary storage device 303, the display device 304, the input device 305, and the communication device 306 are connected via a bus 310.

The control device 301 executes a program read from the auxiliary storage device 303 to the main storage device 302. The main storage device 302 is a memory such as ROM and RAM. The auxiliary storage device 303 is a hard disk drive (HDD), a memory card, or the like. The storage unit 12 of FIGS. 2 and 3 corresponds to the main storage device 302 and the auxiliary storage device 303.

The display device 304 displays a status of the node 10 and the like. The display device 304 is, for example, a liquid crystal display or the like. The input device 305 is an interface for operating the node 10. The input device 305 is, for example, a button provided at the housing of the node 10. The display device 304 and the input device 305 may be realized by a touch panel or the like having a display function and an input function. Further, the node 10 does not have to include the display device 304 and the input device 305.

The communication device 306 is an interface for communicating with another node 10, an external device, and the like.

The program executed on the node 10 of the first and second embodiments is a file in an installable format or an executable format, and is provided as a computer program product being recorded in a computer-readable storage medium such as a CD-ROM, a memory card, a CD-R, or a DVD.

Further, the program executed by the node 10 of the first and second embodiments may be stored on a computer connected to a network such as the Internet and provided to be downloaded via the network. Further, the program executed on the node 10 of the first and second embodiments may be configured to be provided via a network such as the Internet without being downloaded.

Further, the program of the node 10 of the first and second embodiments may be configured to be provided by being stored in a ROM or the like in advance.

The program executed by the node 10 of the first and second embodiments has a modular structure including some of the functional blocks of the node 10 of FIG. 2, which can be realized by the program. In the actual hardware, each functional block is loaded on the main storage device 302 by the control device 301 reading a program from the storage medium and executing the program. In other words, each of the above functional blocks is generated on the main storage device 302.

Note that some or all of the functional block illustrated in FIG. 2 described above may be realized by hardware such as an IC, not by software.

When each function is realized by using a plurality of processors, each processor may realize one of each function, or may realize two or more of each function.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication system comprising a plurality of nodes that forms a wireless multi-hop network,
   one of the plurality of nodes comprising:
   a processor configured to determine a transmission timing of a corresponding network advertising packet based on a transmission schedule in which each of the plurality of nodes has one transmission cell at a location different from locations of other nodes; and
   a wireless communication controller configured to transmit the network advertising packet at the transmission timing,
   wherein
      the transmission schedule is expressed by a plurality of slot offsets that are divided in a time direction and a plurality of channel offsets that are divided in a frequency direction,
      a plurality of transmission cells are specified by the slot offsets and the channel offsets,
      the processor is configured to determine the transmission timing of the corresponding network advertising packet according to a slot offset of its own node transmission cell allocated to an own node and determine a channel to be used for transmitting the network advertising packet according to a channel offset of the own node transmission cell,
      the transmission schedule is expressed by repeating slot frames including a plurality of the transmission cells, and
      the wireless communication controller is configured to transmit the network advertising packet using a specific slot frame for which a remainder resulted from dividing a slot frame number that identifies a current slot frame by a predetermined number β is smaller than a number of the channel offsets.

2. The system according to claim 1, wherein
   the channel offset of the transmission cell for the network advertising packet is specified by a remainder caused by a number of channels which is a value obtained by dividing a slot offset number that identifies the slot offset by a predetermined number α.

3. The system according to claim 1, wherein
   the transmission schedule is expressed by repeating slot frames including a plurality of the transmission cells, and
   the wireless communication controller is configured to transmit the network advertising packet when a slot offset number that identifies the slot offset of the own node transmission cell matches a remainder caused by the number of channels of a slot frame number that identifies a current slot frame.

4. The system according to claim 1, wherein the wireless communication controller is configured to specify another node transmission cell to which a network advertising packet of another node is transmitted based on the transmission schedule and wait for reception of the network advertising packet transmitted by the other node by the other node transmission cell.

5. The system according to claim 1, wherein the node allocated to the transmission cell of the network advertising packet is determined based on an instruction from a predetermined device.

6. The system according to claim 1, wherein the node allocated to the transmission cell of the network advertising packet is determined based on identification information that identifies the node.

7. The system according to claim 1, wherein the network advertising packet is at least one of a beacon, an extended beacon, and a routing protocol control packet.

8. A node comprising:
a processor configured to determine a transmission timing of a corresponding network advertising packet based on a transmission schedule in which each of a plurality of nodes that forms a wireless multi-hop network has one transmission cell at a location different from locations of other nodes; and
a wireless communication controller configured to transmit the network advertising packet at the transmission timing,
wherein
the transmission schedule is expressed by a plurality of slot offsets that are divided in a time direction and a plurality of channel offsets that are divided in a frequency direction,
a plurality of transmission cells are specified by the slot offsets and the channel offsets,
the processor is configured to determine the transmission timing of the corresponding network advertising packet according to a slot offset of its own node transmission cell allocated to an own node and determine a channel to be used for transmitting the network advertising packet according to a channel offset of the own node transmission cell,
the transmission schedule is expressed by repeating slot frames including a plurality of the transmission cells, and
the wireless communication controller is configured to transmit the network advertising packet using a specific slot frame for which a remainder resulted from dividing a slot frame number that identifies a current slot frame by a predetermined number $\beta$ is smaller than a number of the channel offsets.

9. A computer program product for a plurality of nodes that forms a wireless multi-hop network, the computer program product comprising a non-transitory computer-readable medium including programmed instructions, the instructions causing a computer of one of the plurality of nodes to execute:
determining a transmission timing of a corresponding network advertising packet based on a transmission schedule in which each of the plurality of nodes has one transmission cell at a location different from locations of other nodes; and
transmitting the network advertising packet at the transmission timing,
wherein:
the transmission schedule is expressed by a plurality of slot offsets that are divided in a time direction and a plurality of channel offsets that are divided in a frequency direction,
a plurality of transmission cells are specified by the slot offsets and the channel offsets,
the transmission timing of the corresponding network advertising packet is determined according to a slot offset of its own node transmission cell allocated to an own node and a channel to be used for transmitting the network advertising packet is determined according to a channel offset of the own node transmission cell,
the transmission schedule is expressed by repeating slot frames including a plurality of the transmission cells, and
the network advertising packet is transmitted by using a specific slot frame for which a remainder resulted from dividing a slot frame number that identifies a current slot frame by a predetermined number $\beta$ is smaller than a number of the channel offsets.

* * * * *